US012106637B2

United States Patent
Gotlieb et al.

(10) Patent No.: US 12,106,637 B2
(45) Date of Patent: *Oct. 1, 2024

(54) PLAY MY BILL RETAIL LOTTERY GAME

(71) Applicant: Blackhawk Network, Inc., Pleasanton, CA (US)

(72) Inventors: Richard Alan Gotlieb, Alamo, CA (US); Melissa Murillo, Tracy, CA (US)

(73) Assignee: Blackhawk Network, Inc., Pleasanton, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/208,476

(22) Filed: Jun. 12, 2023

(65) Prior Publication Data

US 2023/0326301 A1    Oct. 12, 2023

Related U.S. Application Data

(63) Continuation of application No. 16/446,134, filed on Jun. 19, 2019, now Pat. No. 11,749,069.

(60) Provisional application No. 62/686,999, filed on Jun. 19, 2018.

(51) Int. Cl.
*G07F 17/32* (2006.01)
*G06Q 20/20* (2012.01)
*G06Q 20/34* (2012.01)
*G06Q 50/34* (2012.01)
*G06K 19/06* (2006.01)

(52) U.S. Cl.
CPC .......... *G07F 17/329* (2013.01); *G06Q 20/20* (2013.01); *G06Q 20/342* (2013.01); *G06Q 50/34* (2013.01); *G07F 17/3251* (2013.01); *G06K 19/06028* (2013.01); *G06K 19/06037* (2013.01); *G07F 17/3255* (2013.01)

(58) Field of Classification Search
CPC .............. G07F 17/329; G07F 17/3251; G07F 17/3255; G06Q 20/342; G06Q 20/20; G06Q 50/34; G06Q 20/102; G06Q 20/387

See application file for complete search history.

(56) References Cited

U.S. PATENT DOCUMENTS

2002/0116266 A1   8/2002  Marshall
2005/0014551 A1   1/2005  Packes, Jr. et al.
2017/0091742 A1   3/2017  Zygula

*Primary Examiner* — Thomas H Henry
(74) *Attorney, Agent, or Firm* — Barnes & Thornburg LLP; Jerry C. Harris, Jr.

(57) ABSTRACT

A computer-implemented method for providing a lottery game including providing a lottery ticket for purchase; processing a purchase of the lottery ticket, wherein the lottery ticket was part of a purchase transaction comprising at least one good or service and the lottery ticket; and communicating a result of a lottery game comprising the lottery ticket.

20 Claims, 8 Drawing Sheets

PLAY MY BILL RETAIL LOTTERY GAME

CROSS-REFERENCE TO RELATED APPLICATIONS

This application claims priority to U.S. Ser. No. 16/446,134 filed Jun. 19, 2019 by Richard Alan Gotlieb, et al. and entitled "Play My Bill Retail Lottery Game," which claims priority to provisional application U.S. Ser. No. 62/686,999 filed Jun. 19, 2018 by Richard Alan Gotlieb, et al. and entitled "Play My Bill Retail Lottery Game," U.S. Ser. No. 16/446,134 and provisional application U.S. Ser. No. 62/686,999 are incorporated herein by reference in their entireties.

BACKGROUND

Generally, a lottery is a draw-based lottery, where a player makes a wager with respect to a subsequently occurring event, wherein the event occurs at a predetermined time in the future. For example, a player may wager based upon numbers that will be drawn in the subsequent event. The numbers, which may be selected by the player or randomly selected if the player does not have a preference for the numbers, are printed on a ticket and provided to the player. Once the event occurs, for example the numbers are drawn or generated by the lottery organization, the ticket may be a winner depending on if one or more of the selected numbers were drawn or generated.

What is desired is a lottery game in which a player's wager initiates the game and the player is almost immediately (i) determined to be a winner (or not), (ii) informed as to the determination, and (iii) if a winner, provided the associated winnings. Such a novel lottery game is described herein.

SUMMARY

In some embodiments is a computer-implemented method for providing a lottery game. In some embodiments, the computer-implemented method for providing a lottery game providing a lottery ticket for purchase comprises processing a purchase of the lottery ticket, wherein the lottery ticket was part of a purchase transaction comprising at least one good or service and the lottery ticket and communicating a result of a lottery game comprising the lottery ticket.

In some embodiments is a computer-implemented system for providing a lottery game, the system comprising a lottery ticket provider, a lottery game provider, a point of sale, and a purchase transaction processor.

DETAILED DESCRIPTION

Figure 1A:
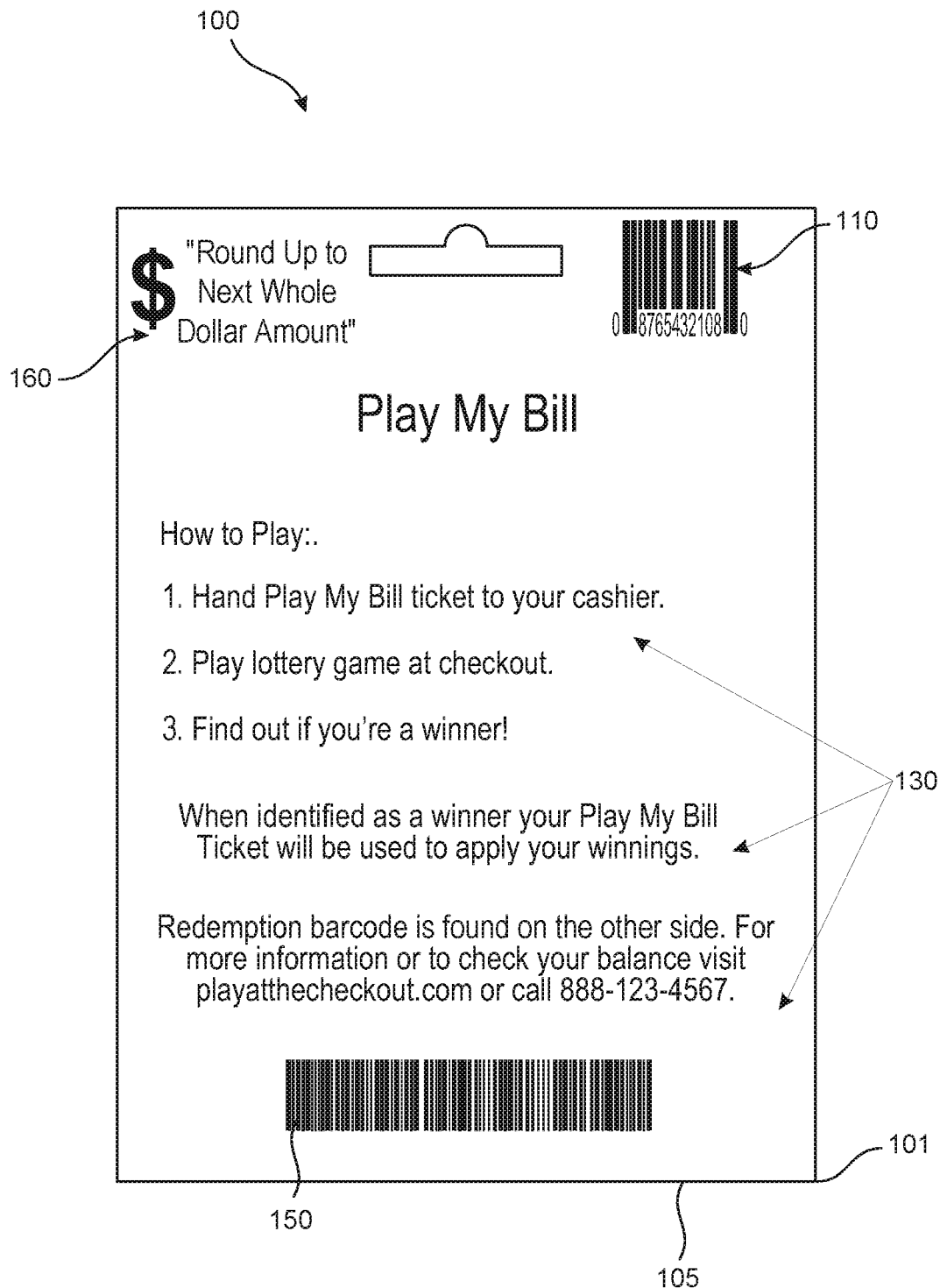
FIG. 1A illustrates a front view a Play My Bill Ticket according to an embodiment of the disclosure.

Embodiments of the disclosure relate to a new lottery game tied to retail shopping. Embodiments of the disclosure allow for a consumer to place a variable or fixed wager for a chance to win the goods or services the consumer is purchasing free of charge.

Typically, a wager consists of four elements: a) amount of wager; b) prize payout; c) probability of winning; and d) a targeted amount of profit. This disclosure allows for the amount of the wager and the prize payout to be dynamic and known only at the time the wager is made, and the disclosure dynamically adjusts the probability of winning to ensure the wager is consistent with a targeted amount of profit.

In an embodiment of the disclosure, a consumer at a grocery retailer would have the chance to win the amount of their grocery purchase for a fixed or variable wager. For example, the consumer's shopping basket may total $78.40. The consumer may be asked if they are interested in wagering an amount for the chance of winning the $78.40 grocery order free of charge. If the consumer is interested in placing a wager, the amount to the wager must be captured. In one embodiment, the cashier may ask the consumer if they wish to "round up the purchase to the next whole dollar amount" and the amount rounded up would be the wager, in this example the wager would be $0.60.

The amount of the wager and the amount of the grocery basket/shopping cart would be communicated to a computer system which would automatically adjust the probability of winning to target a set profit amount. This computer system would also determine if the consumer was a winner or not and would communicate the win or no win back to the retailer.

Existing central gaming systems, e.g., central gaming system (CGS) 540 or transaction processing systems, e.g., transaction processing system 520, may manage the actual game dynamics, including assigning an outcome to a wager, and may determine the probability of winning based on the size of the wager and the prize payout. The probability of winning may be based on a value assigned to a correlation of a wager amount and a possible prize payment amount. For example, when the relationship of the value of wager amount and the value of possible prize payment amount changes, e.g., in an equation where the value of wager amount is the dividend and the value of possible prize payment amount is the divisor, the quotient decreases, the possibility of winning also decreases by a predetermined factor. This disclosure describes a system that is meant to integrate with these other systems to accomplish four major sub-systems that are necessary when an embodiment of the disclosure is used in a retail shopping environment, including: communicating the ability to place a wager to win the consumer's shopping basket free of charge and explaining how the wager works; capturing wager information; communicating wager information to central gaming system; and pay out of winning wagers.

Redemption of winnings may occur when the consumer may be paid out via one of the following methods when identified as a winner. When the POS is integrated with the ticket distributor, in an embodiment, the ticket distributor (through a previous integration with the retailer's POS system) sends a message to the POS to update the previous purchase's information regarding tender type and amount to be paid for by wager winnings and prompts a POS/cashier to refund the amount the consumer paid. In some embodiments, the consumer will receive a cash value reward via their loyalty app and can apply the credit towards their next transaction. In some embodiments, when the consumer is identified a winner, a coupon will print out at the cash register with a unique winner code and short message code number. The consumer will be required to text the unique winner code the short message code number for redemption. Once verified as a winner, the consumer may be issued a link to access an electronic stored-value card. In some embodiments, the cashier will issue the consumer a physical electronic stored-value card for the prize value after tender is completed.

Another method to accomplish payout of winnings (e.g., paying for the consumer's order) may comprise the addition of a barcode to the paper chit (from the beginning/production of the chit). This bar code would correspond to a stored-value card account number for the retailer who sold the Play My Bill ticket product. If the party's system who assigns an outcome to a play responds that a particular chit was a winner, then the ticket distributor would fund the stored-value card account associated with stored-value card account number with an amount equal to the amount of the wager. The consumer can then use the Play My Bill ticket with the pre-printed bar code (redemption code) to enable a redemption of the amount of the stored-value card (either an electronic stored-value card or a physical stored-value card).

Figure 1B:
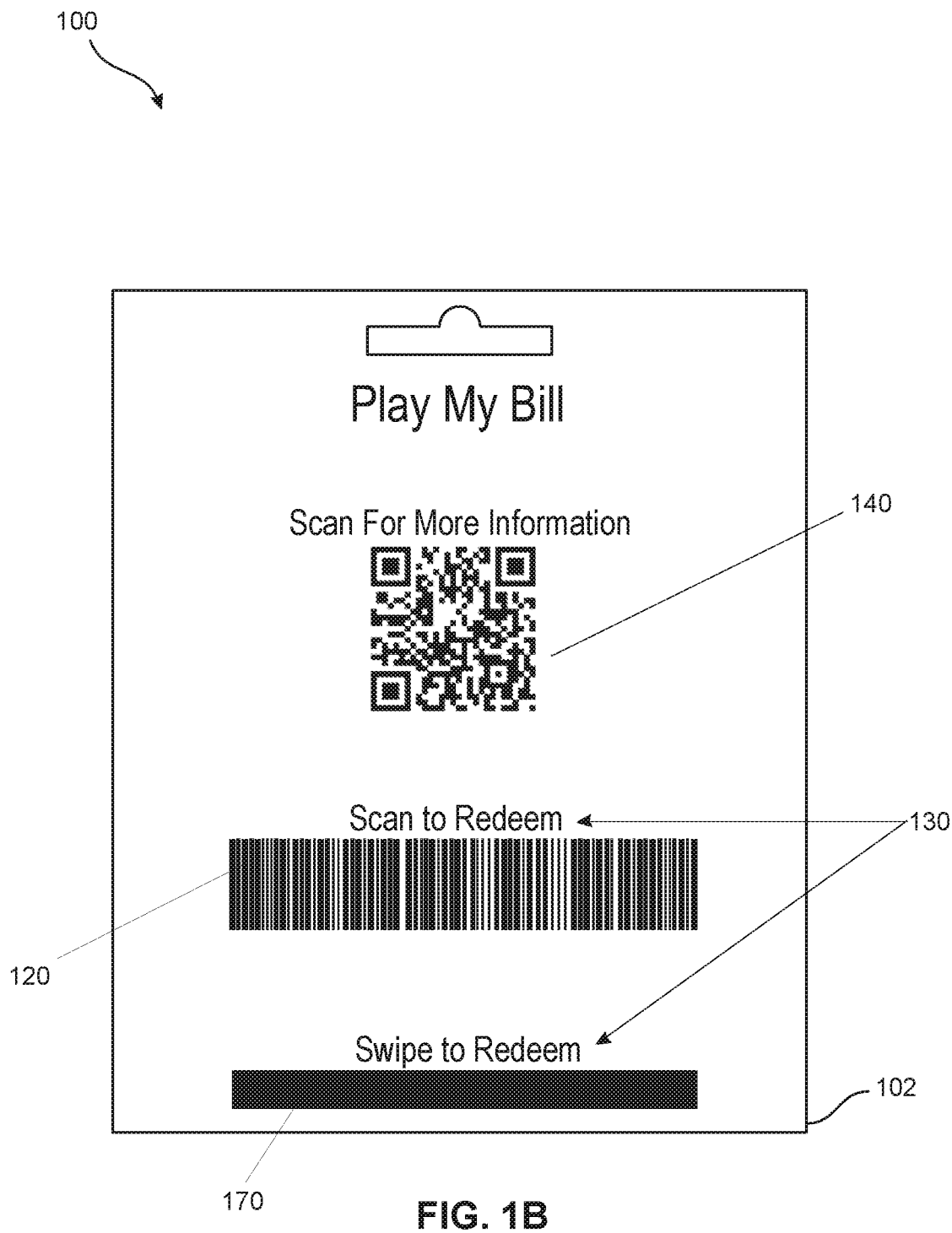
FIG. 1B illustrates a back view a Play My Bill Ticket according to an embodiment of the disclosure.

Referring to FIGS. 1A and 1B, the disclosure may comprise the use of a chit, for example a Play My Bill ticket 100 is shown; particularly, a front view 101 and back view 102 are shown, respectively. In various embodiments, the Play My Bill ticket 100 includes a substrate 105 of a suitable material, for example, a cardstock, a cardboard, a chipboard, another paper material, a plastic, or combinations thereof, such as a paper material having a plastic coating.

A consumer may pick up a Play My Bill ticket 100 capable of being merchandised on a display fixture containing a bar code 110 (e.g., a UPC bar code) or other similar symbol capable of being scanned by the retailer's Point of Sale (POS) system 501. The Play My Bill ticket 100 could be merchandised throughout the store and is used as an instrument to initiate the game at the register.

In the embodiment of FIGS. 1A and 1B, the Play My Bill ticket 100 is imprinted with various indicia (such as certain numbers, symbols, words and the like). Particularly, in the embodiments of FIGS. 1A and 1B, the Play My Bill ticket 100 is imprinted with a product identifier bar code 110, a redemption barcode 120, play instructions 130, confirmation information 140, and an activation barcode 150; however, it is understood that any of the indicia 110, 120, 130, 140, and 150 could comprise another form of indicia, e.g., a magnetic stripe, a quick response code, etc.

As shown in FIGS. 1A and 1B, in various embodiments, the Play My Bill ticket 100 may include various additional indicia. In various embodiments, the indicia may be machine-readable (such as via a scanner or card reader), human-readable, or both. For example, in various embodiments, the indicia may comprise a magnetic stripe 170, a barcode (e.g., a linear barcode such as a UCC 128 barcode (e.g., 120) or a matrix barcode, such as a quick-response code 140 (e.g., a QR code®—QR code® is a registered trademark of Denso Wave Incorporated) a number, a combination of letters and number, or combinations thereof.

For example, in the embodiment of FIGS. 1A and 1B, the Play My Bill ticket 100 includes a redemption code 120. As shown in FIG. 1A, the redemption code 120 is a machine-readable barcode, although in other embodiments a redemption code 120 may take any suitable configuration (e.g., a magnetic stripe or quick response code). In an embodiment, the redemption code 120 is unique, for example, with respect to the particular Play My Bill ticket 100 with which it is associated.

Also, in the embodiment of FIGS. 1A and 1B, the Play My Bill ticket 100 includes various user instructions 130, for example, related to rules for gameplay; account status inquiries; redemption instructions; and the like.

Also, in the embodiment of FIGS. 1A and 1B, the pre-printed lottery ticket includes confirmation information 140. As shown in FIG. 1B, the confirmation information 140 may comprise a quick-response response code (e.g., a QR code®), a website, a call-number, a text-number (SMS), or combinations thereof. As will be further explained, a purchaser may use one or more of the confirmation information 140 to inquire as to the status of their Play My Bill Ticket 100 and any redeemable value associated therewith.

Also, in the embodiment of FIGS. 1A and 1B, the Play My Bill ticket 100 includes an activation code 150. As shown in FIG. 1A, the activation code 150 is a machine-readable barcode, although in other embodiments an activation code 150 may take any suitable configuration (e.g., a magnetic stripe or quick response code). In an embodiment, the activation code 150 is unique, for example, with respect to the Play My Bill ticket 100 with which it is associated. The activation code 150 may be scanned by a POS 502 to activate the redemption code 120; thus, allowing the consumer with the Play My Bill ticket 100 to use the Play My Bill ticket 100 as a gift card as the Play My Bill ticket 100's redemption code 120 may be processed at a POS 502 via scanning or swiping to compete and/or participate in a purchase transaction.

Also, in the embodiment of FIGS. 1A and 1B, the Play My Bill ticket 100 includes denomination indicia 160, for example, the price or value of the Play My Bill ticket 100, e.g., "Round Up Purchase to Nearest Whole Dollar Amount," "Round Up Purchase to Next Whole Dollar Amount," or "$1.00," In an embodiment the denomination amount, i.e., the cost to the customer to participate in the "Play My Bill" lottery game may be determined and/or designated by a retailer, a central gaming system, a transaction processor, or combinations thereof.

Figure 2:
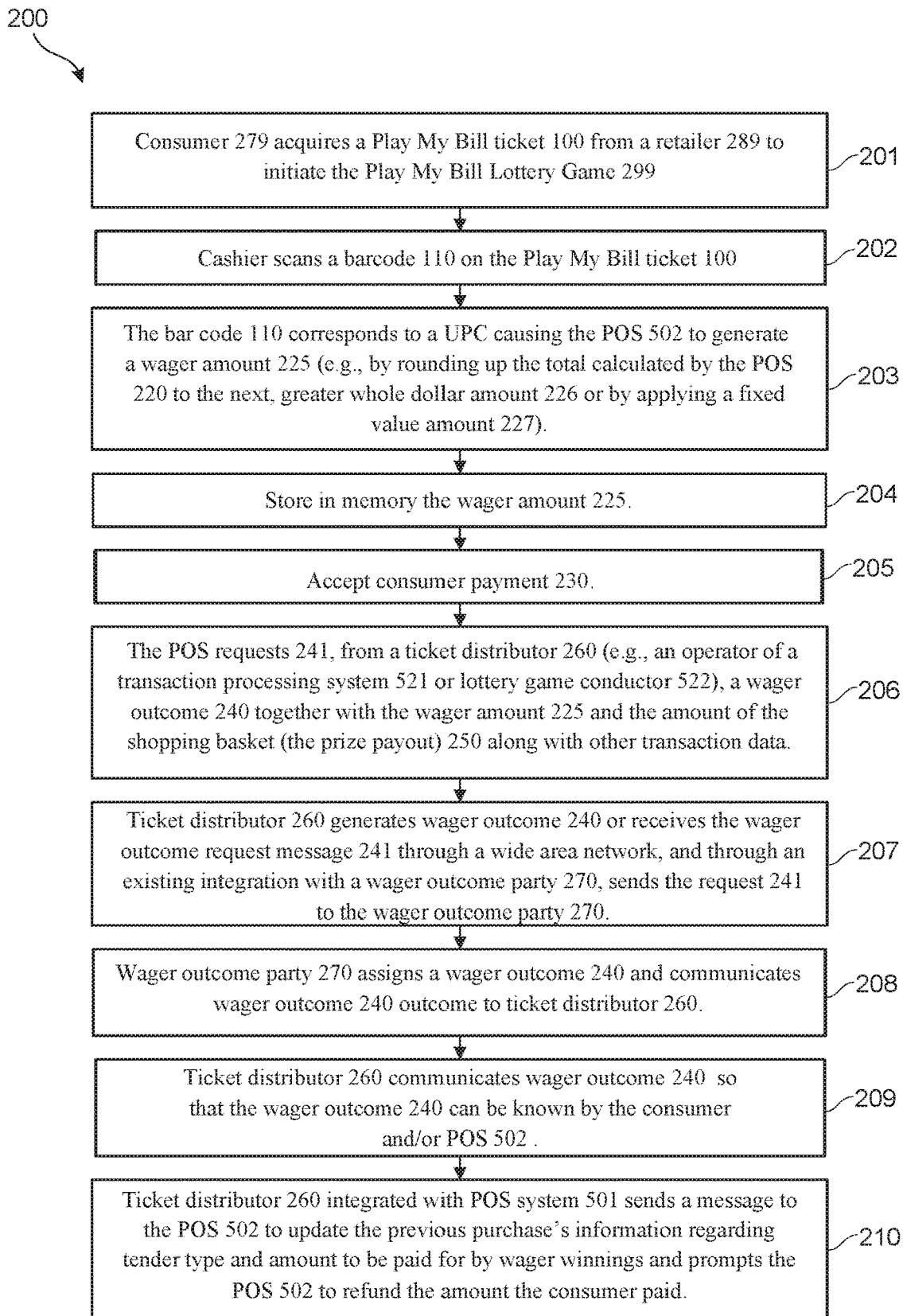
FIG. 2 illustrates a flow chart for an exemplary method for completing a "Play My Bill" lottery game according to an embodiment of the disclosure.

As shown in FIG. 2, method 200 is an embodiment of effectuating a Play My Bill Lottery Game 299 of the present disclosure in which at step 201 the consumer 279 acquires a Play My Bill ticket 100 from a retailer 289 (e.g., consumer at a retailer's place of business).

At 202, the consumer 279 presents the Play My Bill ticket 100 to a cashier at a point of sale 502 as part of a purchase transaction wherein the consumer 279 is purchasing at least one other good or service from the retailer 289 and the cashier enters the purchase information (e.g., bar code 110) of the Play My Bill ticket 100.

As shown at step 203, the purchase information corresponds to a UPC bar code 110 which would the cause the POS 502 generate a wager amount 225. In an embodiment, the wager amount 225 may be generated by rounding up the total calculated by the POS 220 for the consumer's purchase to the next, greater whole dollar amount, the wager amount 225 being the calculated amount required to get to the next, greater whole dollar amount 226. In an embodiment, the wager amount 225 may be generated by applying a fixed value amount 227 assigned to the Play My Bill ticket, the fixed value amount 227 being unrelated to the total calculated by the POS 220 for the remainder of the consumer's purchase.

At 204, method 200 may further comprise storing in memory the wager amount 225, e.g., the amount rounded up 226 or the fixed amount 227.

At 205, consumer payment 230 is accepted by the POS 502. The acceptance of the consumer payment 230 causes the initiation of the Play My Bill Lottery Game 299.

At 206, the POS 502, through an existing integration to a ticket distributor 260 (e.g., CGS 540 (e.g., 540a, 540b, 540c), transaction processing system 520 operator 521, or lottery game conductor 523), may request a wager outcome 240 (the wager outcome request message 241) together with the amount stored in memory 226 or the fixed amount 227 as the case may be (the wager amount 225) and the amount of the shopping basket (the prize payout) 250 along with other transaction data.

At 207, the ticket distributor 260 may generate the wager outcome 240 or receive the wager outcome 240 through a wide area network, and through an existing integration with a party capable of assigning outcomes to wagers, send the request for a wager outcome to the wager outcome party 270.

At 208, if the ticket distributor 260 did not generate the wager outcome 240, the wager outcome party 270 may assign a wager outcome 240 and communicate the wager outcome 240 to ticket distributor 260.

At 209, the ticket distributor 260 may send the wager outcome 240 to another network node, so that the wager outcome 240 can be known by the consumer 279 and the POS 502.

At 210, the ticket distributor 260, through a previous integration with the retailer's POS system 501, sends a message to the POS 502 to update the previous purchase's information regarding tender type and amount to be paid for by wager winnings and prompts the cashier, POS 502, to refund the amount the consumer paid.

Figure 3:
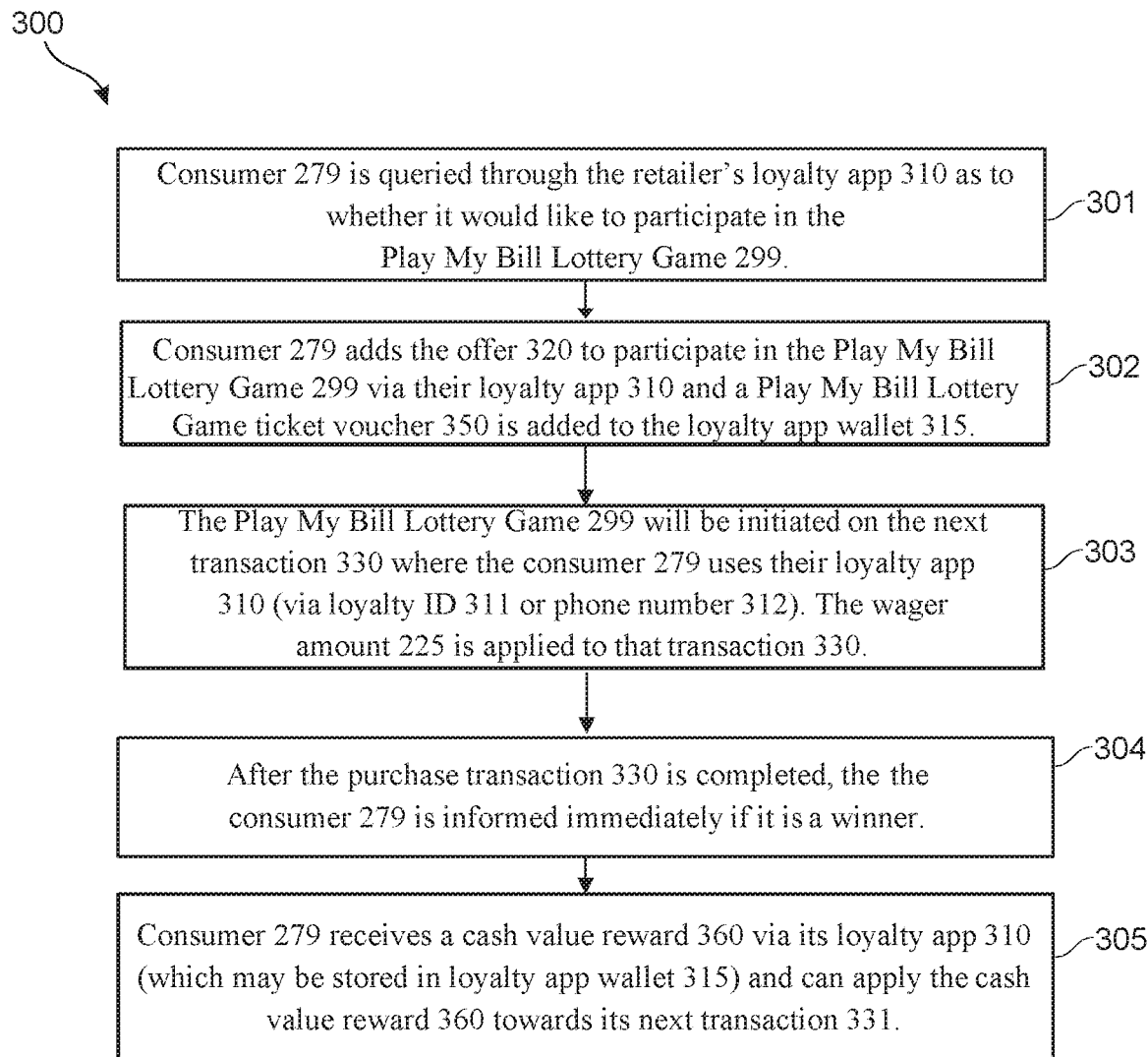
FIG. 3 illustrates a flow chart for another exemplary method for completing a "Play My Bill" lottery game according to an embodiment of the disclosure.

As shown in FIG. 3, method 300 is an embodiment of effectuating a Play My Bill Lottery Game 299 of the present disclosure in which at step 301 the consumer 279 queried through retailer's loyalty program/app 310 as to whether the consumer 279 would like to participate in the Play My Bill Lottery Game 299. For example, the retailer 289 may utilize a loyalty program and/or app 310 that the consumer 279 may interact with to provide the consumer with an offer 320 to participate in the Play My Bill Lottery Game 299. The offer 320 may allow the consumer 279 to authorize a wager amount 225 (e.g., pay the difference ($0.40) between its shopping cart purchase total ($74.60) and the next, greater whole dollar amount ($75.00) or pay a fixed amount ($0.50)) to play the Play My Bill Lottery Game 299 for a chance to win free groceries 485 or cash value prize 490 on their next purchase.

At 302, the consumer 279 may accept the offer 320 via their loyalty app 310 and, if accepted, a Play My Bill Lottery Game ticket voucher 350 is added to the consumer's loyalty app wallet 315. In an embodiment, the consumer 279 may designate whether the Bill Lottery Game ticket voucher 350 wager amount 225 should be a calculated amount 226 or a fixed amount 227.

At 303, the Play My Bill Lottery Game 299 may be initiated on the next purchase transaction 330 where the consumer 270 uses their loyalty app 310 (e.g., via provision of a loyalty ID 311 or phone number 312). The wager amount 225 is applied to that purchase transaction 360360.

At 304, after the purchase transaction 330 is completed, the cashier would inform the consumer 279 immediately if it is a winner.

At 305, the consumer 279 will receive a cash value reward 360 via its loyalty app 310, e.g., the cash value reward 360 may be transmitted/communicated/delivered to the consumer's loyalty app wallet 315, and the consumer 279 can apply the cash value reward 360 towards its next transaction 331.

Figure 4:
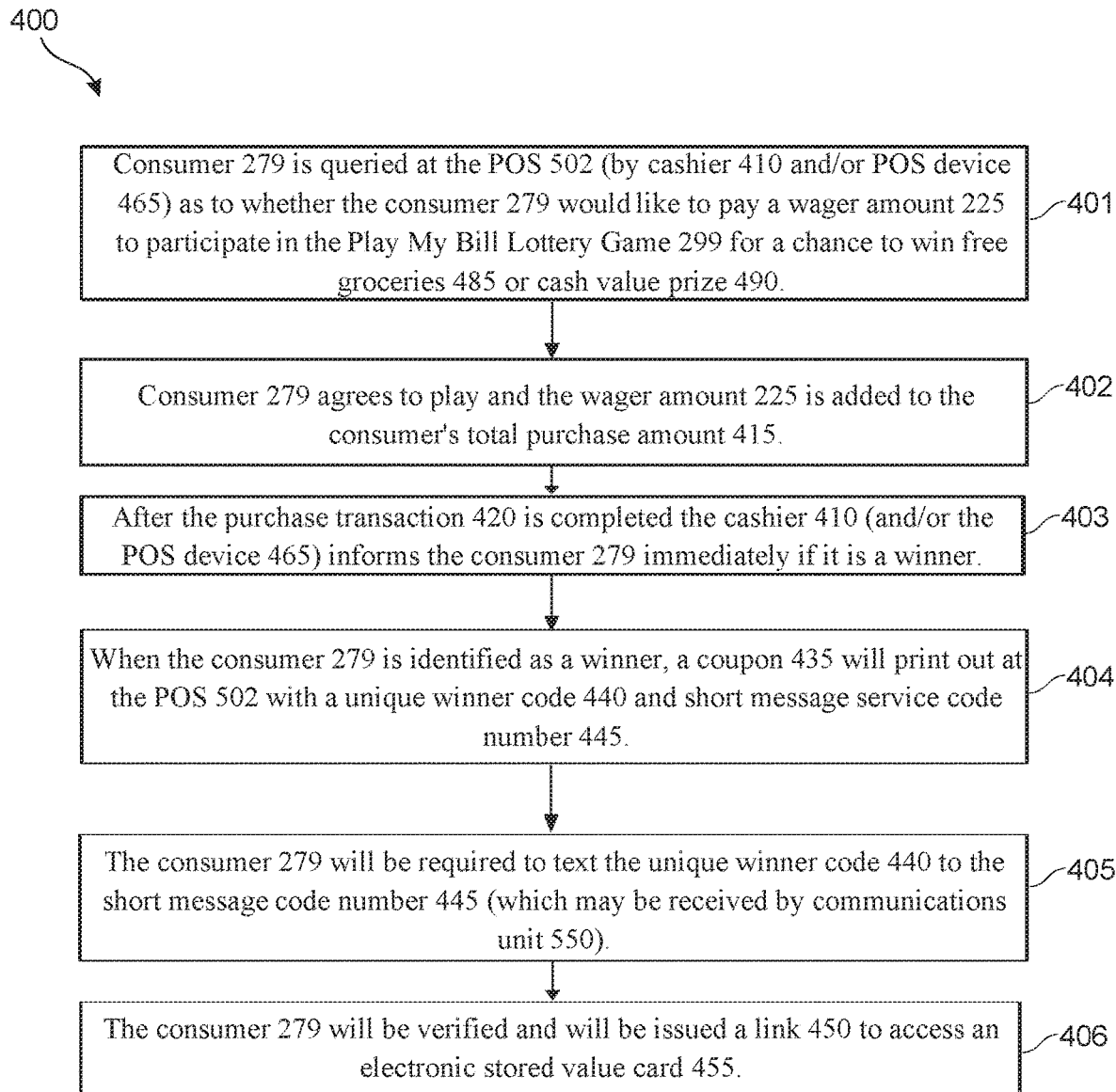
FIG. 4 illustrates a flow chart for another exemplary method for completing a "Play My Bill" lottery game according to an embodiment of the disclosure.

As shown in FIG. 4, method 400 is an embodiment of effectuating a Play My Bill Lottery Game 299 of the present disclosure in which at step 401 the consumer 279 queried at the POS 502 as to whether the consumer 279 would like to participate in the Play My Bill Lottery Game 299. In an embodiment, the consumer may be asked by the cashier 410 (e.g., cashier solicits consumer) if the consumer 279 would like to pay $X (e.g., pay the wager amount 225) to play the Play My Bill Lottery Game 299 for a chance to win free groceries 485 or cash value prize 490. In an embodiment, the consumer may be prompted by a POS device 465 (e.g., a pin pad, a register display, or a speaker) if the consumer 279 would like to pay $X (e.g., pay the wager amount 225) to play the Play My Bill Lottery Game 299 for a chance to win free groceries 485 or cash value prize 490.

At 402, the consumer 279 agrees to play and the wager amount 225 is added to the consumer's total purchase amount 415.

At 403, after the purchase transaction 420 is completed, the Play My Bill Lottery Game 299 is initiated and the cashier 410 (and/or the POS device 465) informs the consumer 279 immediately if the consumer 279 is a winner.

At 404, when identified a winner, a coupon 435 will print out at the POS 502 with a unique winner code 440 and short message service code number 445.

At 405, the consumer 279 will be required to text the unique winner code 440 to the short message code number 445 (which may be received by communications unit 550).

At 406, the consumer 279 will be verified and will be issued a link 450 to access an electronic stored value card 455 (e.g., an open loop card or a closed loop card) which will be funded with the cash prize value amount 490. The electronic stored value card 455 may be associated by the consumer 279 with the consumer's loyalty app wallet 315.

In some embodiments, the cashier 410 will issue the consumer a physical stored-value card 460 for the prize value 490 after tender is completed.

In some embodiments, the consumer 279, if determined to be a winner, will be refunded by the POS 502 the total purchase amount 415.

Figure 5:
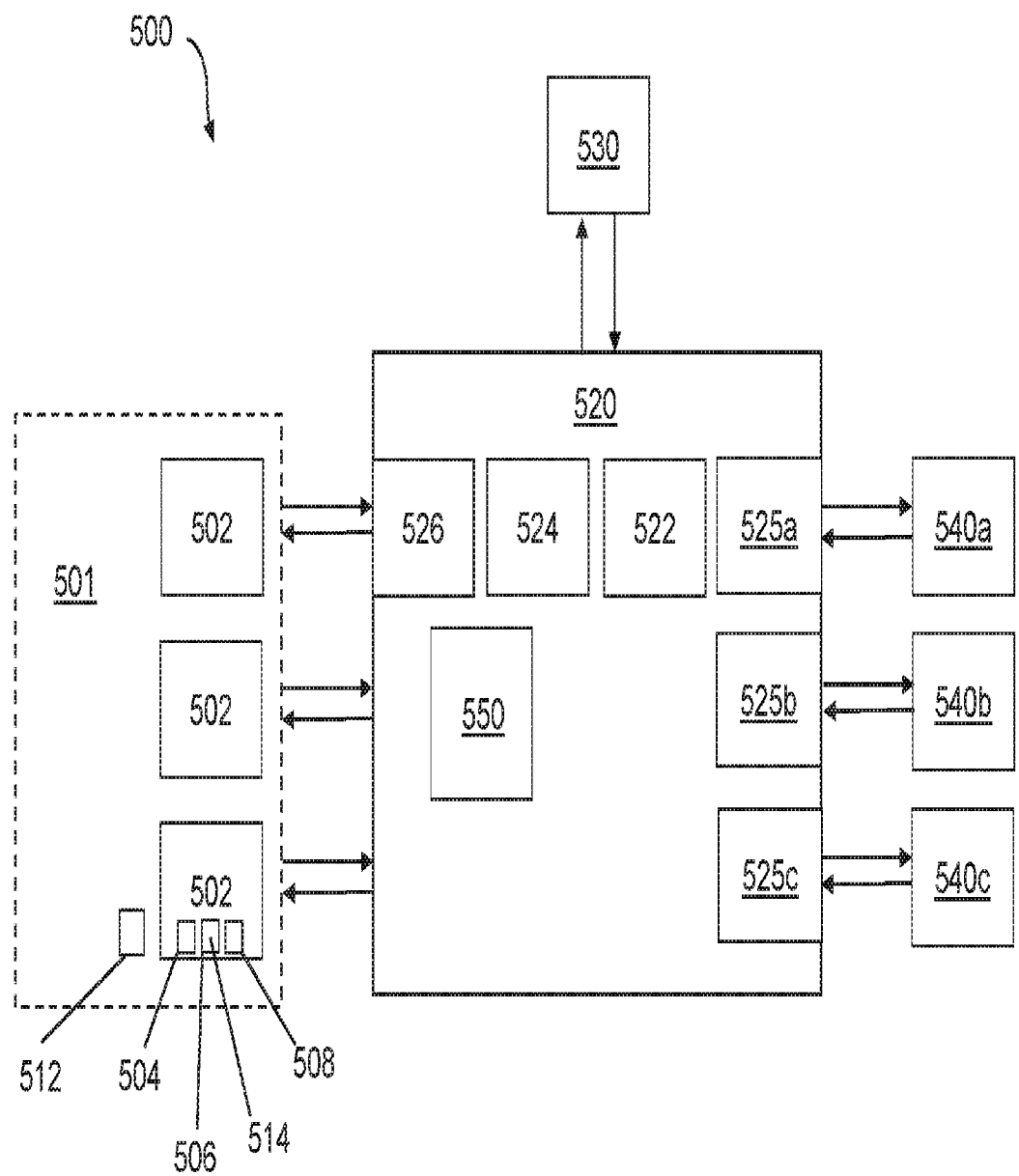
FIG. 5 illustrates a Play My Bill lottery system and/or environment in which a Play My Bill ticket may be purchased at point of sale (POS) to effectuate a wager according to an embodiment of the disclosure.

FIG. 5 illustrates an embodiment of a Play My Bill lottery processing system 500 for processing Play My Bill tickets 100. The Play My Bill lottery processing system 500 generally includes one or more point of sale terminals 502 (POSs) disposed at retailer 289. In the embodiment of FIG. 5, the Play My Bill lottery processing system 500 also includes a transaction processing system 520 communicably coupled to the point of sale terminal 502 and at least one central gaming system (CGS) (e.g., at least one of 540a, 540b, and 540c) communicably coupled to the transaction processing system 520. In various embodiments, various components of the system of FIG. 5 may be operably connected via one or more networks (e.g., broadband, optical, Wi-Fi, Bluetooth, NFC, cellular, satellite, cloud, card processing network, banking network, a local area network, the World Wide Web for Internet, non-cellular mobile phone network, a land-line network, Public Switched Telephone Network (PSTN), a dedicated communication line, other networks for transferring electronic information, or combinations thereof). The communication between various components may be secured using various encryption techniques.

In some embodiments, the POS terminals 502 disposed at the retailer 289 may include a processing unit 504, memory unit 506 and I/O interface(s) 508 for communicating with devices external to the POS terminal 502. Additionally or alternatively, while the embodiment of FIG. 5 illustrates POS terminals 502 disposed at the retailer 289, in some other embodiments, other types of terminals may be used in place or along with conventional POS terminals, for example, network terminals which may include PCs, laptops, handheld devices, mobile phones, or other devices. Network terminals may, for example, be made available in kiosks to provide retailers access to the transaction processing system 520 and the associated functionality.

In some embodiments, the processing unit 504 can comprise an electronic input device, a register or terminal, a computer processing unit ("CPU"), a personal computer, a personal digital assistant (e.g., smart phone), or other means of communicating with the I/O interface(s) 508. In some embodiments, the processing unit 504 may incorporate a "store-and-forward" functionality. Generally, the store-and-forward functionality may operate during activation of a stored-value card such that, if connectivity between the POS terminal 502 and a stored-value processing system is lost during activation of the stored-value card, the processing unit 504 will store the activation request for the stored-value card and communicate the activation request when connectivity is regained, thus allowing the activation to go forward. In some embodiments, the processing unit 504 may be configured to allow the store-and-forward functionality to be disabled or suppressed.

The I/O interface(s) 508 generally comprises one or more interpretation units such as a bar code scanner, magnetic strip reader, optical character recognition device, biometric recognition device, numerical keyboard (e.g., for entering an identification number), or other device configured to interrogate, interpret, capture, or input the data encoded in or on the Play My Bill ticket 100. For example, the I/O interface(s) 508 may comprise a barcode scanner for scanning and/or retrieving machine-readable (e.g., barcode information, such as Universal Product Code information or other information) disposed on a Play My Bill ticket 100. In some embodiments, the POS terminal 502 may also be connected to a printer 512, for example, for printing a receipt of the transaction. The POS terminal 502 includes special programming and/or specific, unique instructions 514 stored in the memory unit 506, which when executed by the processor unit 504, cause the POS terminal 502 to provide certain functionality, as disclosed herein.

In the embodiment, the transaction processing system 520 generally includes a processing unit 522 (e.g., a CPU), one or more memory units 524, one or more I/O interface(s) 526 for effectuating and/or facilitating communicating with components external to the transaction processing system 520, and a communications unit 550 which is integrated with other units/systems capable of storing information and transmitting information according to a desired communication method. The memory unit(s) 524 may store special programming and/or specific, unique instructions that, when executed by the processing unit, cause the transaction processing system 520 to provide certain functionality, as disclosed herein.

Figure 6:
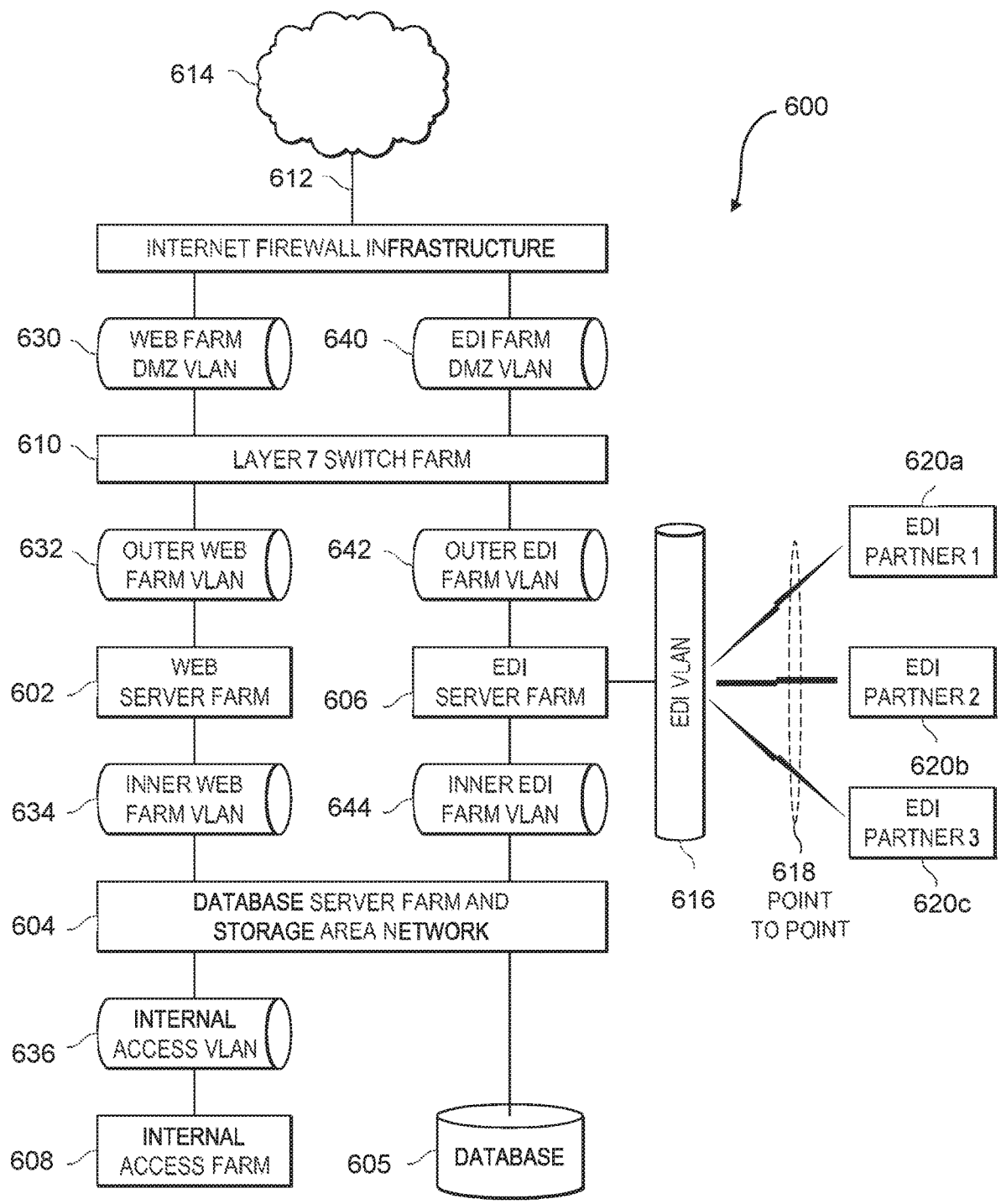
FIG. 6 illustrates a system network that may be used to implement an embodiment of the Play My Bill lottery system of FIG. 5.

FIG. 6 is a block diagram of an example system network 600 that may be used to implement an embodiment of the Play My Bill lottery system of FIG. 5. Those of ordinary skill in the art will appreciate that the system network 600 in FIG. 6 is described to illustrate one example of a network that may be used to implement the system described above with reference to FIG. 5. Many other network architectures not described here may be used as well. In the embodiment of FIG. 6, the system network 600 includes a web server farm 602, a database server farm 604, an electronic data interchange (EDI) farm 606, and an internal access server farm 608. The system network 600 includes a layer 7 switch farm 610 and an Internet firewall infrastructure 612, for example, to implement a consumer front-end over the Internet 614. The consumer front-end may be implemented as a site on the World Wide Web. The system network 600 also includes an EDI virtual local area network (VLAN) 616 with point-to-point connections 618 to EDI partners 620a, 620b, 620c.

In general, the system network 600 in FIG. 6 includes remote and local infrastructure. Connectivity to the system network 600 may be provided by co-location facilities hosting the remote infrastructure. Remote infrastructure includes servers, routers, databases and other network entities that are geographically distributed as needed to provide access to partners and/or to consumers. The remote infrastructure includes devices that may fall under a functional class and may be distributed in the system network 600 as a farm (e.g. web server farm, EDI server farm, etc.). Local infrastructure may include servers, routers, databases, and other network entities that provide limited, primarily internal access within the system, for example, for resource management. Local infrastructure may also be geographically distributed with access limited by network design (e.g. completely internally accessed databases may be maintained within an Intranet).

The system network 600 in FIG. 6 implements a logical separation of server systems based upon type and manner of access. This introduces multiple layers of access, and in turn, provides a deeper layer of security, even within the system network 600. The system network 600 includes a general vertical depth of separation of service and levels of security allowing for several layers of access. The layers of access range from the consumer front-end (via the Internet 614), which is at the forefront and has the lightest layer of security, to a system database 605, which is at the deepest layer of access and security.

The layers of access are implemented as virtual local area networks (VLANs) having no real access to one another except through routing done by routing modules on the network switches. Each VLAN may be configured appropriately to limit access according to the appropriate level of security. The levels of security correspond in general to four tiers of network entities: the presentation tier, the business logic tier, the data access tier, and the data tier.

At the top level of access (for the consumer front-end), the presentation tier is responsible for delivery of data to end clients. The end clients may be consumers or partners 620a, 620b, 620c. In the presentation tier, data is formatted for communication with the business logic tier of applications that processes requests and handles data delivery to the client applications. Data in the presentation tier may be in XML format along with XSLT stylesheets to allow rendering by client applications. The presentation tier operations, generally, in a layer of servers from the web server farm 602 that resides in a DMZ (Demilitarized Zone) network. These servers in the DMZ network may be accessed using a web farm DMZ VLAN 630 and the Layer 7 switch farm 610. The DMZ network servers operate as proxy servers between consumers and the enterprise infrastructure.

The next layer of access includes servers in the web server farm 602 that form the business logic tier. The business logic tier includes application code (Beans) that will handle requests from client applications (such as web browsers) and make requests to the Data Access Tier for relevant data. It will then process the data and deliver it for presentation to the client applications. The business logic tier is kept separate from interaction with consumers to preserve integrity of the applications and access to the database 605. Added security may be provided by an outer web farm VLAN 632.

In the next layer, the data access tier may make requests directly to the Data Tier (or the database 605). The data access tier may be separate from the business logic tier of applications to differentiate how the data is stored and how it is retrieved from certain platforms. Security may be configured with an inner web farm VLAN 634.

The data tier is in the last layer of security, which includes the database 605, and which has the tightest security to protect the most critical data. Security may be configured with an internal access VLAN 636.

The system network 600 includes a general horizontal separation of EDI partnerships, which are logical VLANs that separate access by each partner 620a, 620b, 620c to the infrastructure of the example system for implementing the disclosed lottery system using the system network 600. In general, a partner may access their own private VLAN at 616 and 618 into the system network 600 infrastructure through a VPN concentrator or routed through a routing module on the backbone switch. This structure may isolate potential security breaches from single partners 620a, 620b, 620c. It may also prevent any partner 620a, 620b, 620c from being able to access rival partner data from the system network 600.

The EDI partner access to the system network 600 may also be layered vertically according to level of security. An EDI farm DMZ VLAN 640 provides the lowest level of security at the consumer front-end for access to the EDI server farm 606. The outer EDI farm VLAN 642 provides a higher level of security at a business logic level similar to the business logic tier described above with reference to the web server farm 602. The highest level of security is provided at the inner EDI farm VLAN 644 for access to more critical data via the database server farm 604.

Connectivity to the system network 600 may be provided by co-location facilities hosting the remote infrastructure. Connectivity may be provided by Tier 1 Internet Backbone providers to ensure access to most networks without having to transcend networks in order to provide the shortest network path from Leverage Consumer to Leverage Infrastructure. Besides utilizing connectivity to Tier 1 providers and managing complex BGP routes to the Internet Backbone, a backup connection to InterNAP will also be established.

In the example system for implementing an embodiment of the disclosed lottery system, the complex backbone connections force the infrastructure to appear "local" to the consumers accessing the system network 600 via their host ISPs. This prevents the consumer from transcending networks between peer networks and eventually experience degraded network performance.

The web server farm 602 includes two banks of servers for serving either static or dynamic content. Each bank may be designated as either the static web farm or the dynamic web farm. The static web farm may service client requests for static content that is neither database-generated nor does it use any type of server content processing and generation before being transmitted through the Internet to the client applications (e.g. web browser). Such examples of content would be images, video, or web templates. The dynamic web farm may be designed to serve dynamic content generated in multiple ways, whether that is done via XML/XLS transformation, server-side scripting, or through middle-tier applications that directly interfaces with the database 605.

The web server farm 602 may be implemented using any suitable hardware and software systems implementing server functions. In one example implementation, the web server farm 602 is implemented with Sun® multiprocessor blade servers (Sun® is a registered trademark of Oracle America, Inc.) running either the Solaris® (Solaris® is a registered trademark of Oracle America, Inc.) operating system or Red Hat® Enterprise Linux™ operating system (Red Hat® Enterprise Linux™ are trademarks of Red Hat, Inc.). The example implementation of the web server farm 602 also includes the Zeus® web server (ZWS) application (Zeus® is a registered trademark of Marden-Kane, Inc.). Like the Apache® web server Apache Micro Peripherals, Inc.), the ZWS is a robust, commercial-grade, full-featured and highly efficient web server software. However, ZWS is multi-threaded to leverage the symmetric multiprocessing nature of multi-cored hardware platforms, which increases the response times and load servicing for client requests. The web server farm 602 will also house the Java® application server software (Java® is a registered trademark of Oracle America, Inc.) that operates the applications to service consumer requests on the enterprise website. The Java® application server software may be a combination of Apache® Tomcat for simple Java® applications and JBoss Application Server software for J2EE applications.

It is to be understood that specific implementations of the web server farm 602 may use any suitable hardware and software systems. The hardware and software systems described above are merely examples of the types of hardware and software systems that may be used.

The database server farm 604 may store data specific to consumer front-end interactions and the EDI partner data collected from partners 620a, 620b, 620c. The database server farm 604 may be implemented using any suitable hardware and software systems configured to operate as database servers. In one example implementation, the database server farm 604 is implemented using Sun multiprocessor Enterprise servers banked with multi-core processors and full redundant power and mirrored drives for the operating system and database application. Depending upon the nature of the application and the database 605 that is needed to interface against such applications, the database server farm 604 may run either the Oracle Database Server product or the MySQL Database server product. Also, depending upon the nature of the data that is being stored, highly complex relational database tables may use Oracle while simplistic database schemas may use MySQL. The database server applications may be clustered to ensure high availability and fault tolerance. This will also provide application load balancing among the database server farm 604.

The database 605 for the database server farm 604 may reside in a SAN (Storage Area Network) solution that will offer both high availability and fault tolerance.

It is to be understood that specific implementations of the database server farm 604 may use any suitable hardware and software systems. The hardware and software systems described above are merely examples of the types of hardware and software systems that may be used.

The EDI (Electronic Data Interchange) farm 606 may be designated in the system network 600 to communicate with partners 620*a*, 620*b*, 620*c*. The EDI farm servers 606 may have different applications and permissions from the web server farm 602 to access and process, as well as store, data within the database farm 604. The nature of the applications operating on the EDI farm servers 606 may have more direct access to the database 605 to increase efficiency in data processing and storage. The EDI farm servers 606 may reside in a private VLANs (Virtual Local Area Networks) that can only be accessed via VPN (Virtual Private Network) Concentrators or through specific Point-to-Point access into the VLAN as shown at 616 and 618.

The EDI farm servers 606 may be implemented using any suitable hardware and software system configured to operate server functions. In an example implementation, the EDI server farm 606 is implemented using the same platform as that of the web server farm 602 or by running IBM Mainframes. The EDI farm servers 606 software in the example implementation may also be similar to that of the web server farm 602 software. If the EDI farm servers 606 include IBM Mainframes, then the hardware will run IBM AIX operating systems, and the EDI farm servers 606 will run IBM Websphere Application Server software.

It is to be understood that specific implementations of the EDI server farm 606 may use any suitable hardware and software systems. The hardware and software systems described above are merely examples of the types of hardware and software systems that may be used.

The internal access farm servers 608 may also resemble the web server farm 602 in platform, software, and resource architecture. However, like the EDI farm servers 606, the applications will be tailored for internal access from an enterprise Intranet. Such applications may include data mining and statistical information for marketing and sales.

Referring again to FIG. 5, in some embodiments, the transaction processing system 520 may be configured for communication with one or more information datastores 530, for example, which may individually or collectively include an entry for each of the pre-printed lottery tickets offered for sale the retailer 289 or multiple retailers.

Also, in some embodiments, the transaction processing system 520 may be configured for communication with at least one CGS (e.g., at least one of 540*a*, 540*b*, and 540*c*). In various embodiments, the transaction processing system 520 is configured to utilize one or more application programming interfaces (APIs) that are each configured to allow the transaction processing system 520 to interface and/or interact with a particular CGS (e.g., 540*a*, 540*b*, 540*c*). For example, in the embodiment of FIG. 5 the transaction processing system 520 utilize each of a first API 525*a*, a second API 525*b*, and a third API 525*c* to interface and/or interact with each of a first CGS 540*a*, a second CGS 540*b*, and a third CGS 540*c*. For example, one of the first API 525*a*, second API 525*b*, or third API 525*c* may allow the transaction processing system 520 to enter the play-selections into a particular draw for a particular lottery with one of the first CGS 540*a*, the second CGS 540*b*, or the third CGS 540*c*.

Figure 7:
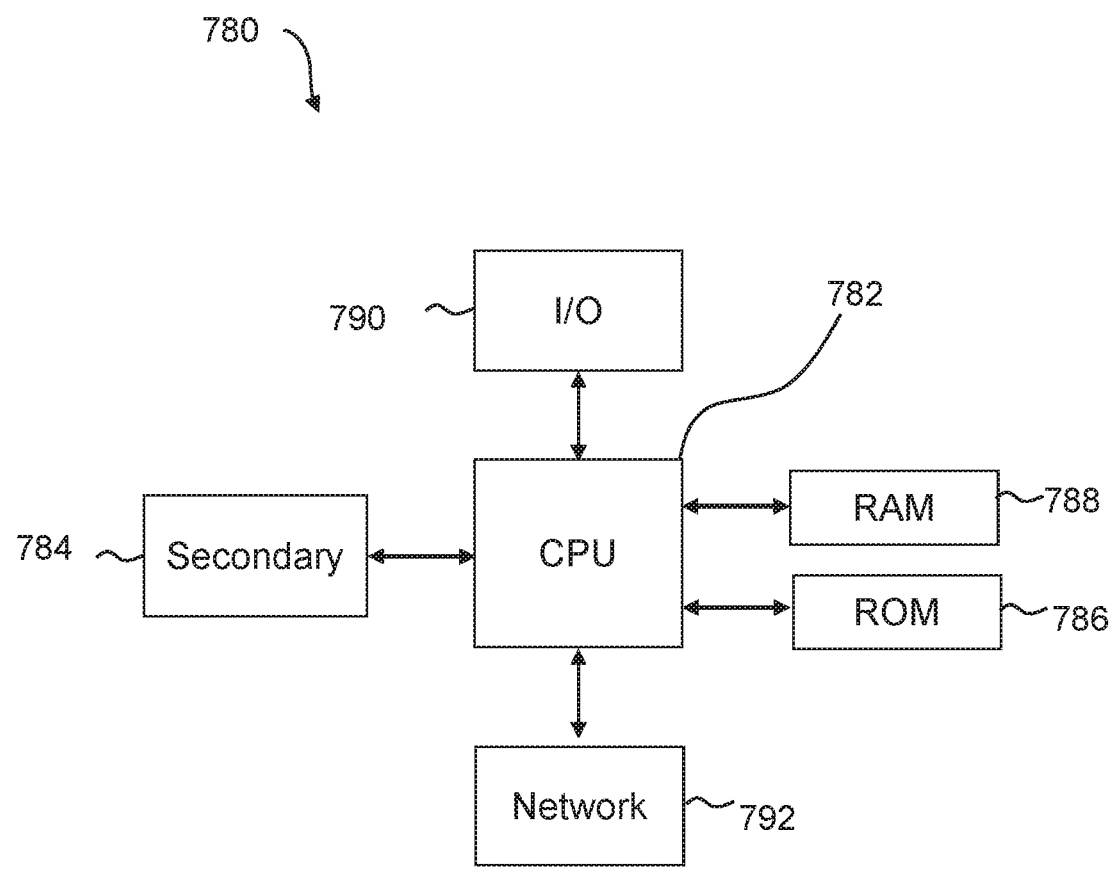
FIG. 7 illustrates a particular machine suitable for implementing the several embodiments of the disclosure.

All of, or a portion of, the Play My Bill lottery system described above may be implemented on any particular machine, or machines, with sufficient processing power, memory resources, and throughput capability to handle the necessary workload placed upon the computer, or computers. FIG. 7 illustrates a computer system 780 suitable for implementing all, or a portion of, one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk-based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed. The following numbered entries represent a non-exhaustive collection of exemplary embodiments of the instantly disclosed subject matter.

What is claimed is:

1. A computer-implemented method for providing a lottery game, the method comprising:
   processing, by a purchase transaction processor, a purchase of a lottery ticket, wherein the lottery ticket comprises a physical substrate, and wherein the lottery ticket was part of a purchase transaction comprising at least one good or service and the lottery ticket;
   establishing, by the purchase transaction processor, at a time of the purchase transaction, a prize amount for the lottery game which is equal to a purchase price of the purchase transaction minus a purchase price of the lottery ticket;
   establishing, by the purchase transaction processor, at a time of the purchase transaction, a winning value amount for the lottery ticket, wherein the winning value of the lottery ticket is equal to the prize amount for the lottery game;
   initiating, by the purchase transaction processor, the lottery game upon the processing of the purchase of the lottery ticket; and
   communicating, by the purchase transaction processor, a result of the lottery game comprising the lottery ticket.

2. The method of claim 1, further comprising: providing, by the purchase transaction processor, the purchase price for the lottery ticket.

3. The method of claim 2 wherein the purchase price for the lottery ticket is a fixed amount.

4. The method of claim 2 wherein the purchase price for the lottery ticket is determined based on a value of the at least one good or service purchased as part of the purchase transaction.

5. The method of claim 4 wherein the purchase price of the lottery ticket is a difference of the value of the least one good or service purchased and a next, greater whole dollar amount.

6. The method of claim 1 wherein communicating the result comprises informing a purchaser of the lottery ticket that the lottery ticket is the winning lottery ticket for the lottery game.

7. The method of claim 6 wherein communicating the result comprises providing the purchaser with a stored-value card which is loaded with an amount equal to the winning value amount for the lottery ticket.

8. The method of claim 7 wherein providing the stored-value card comprises activating a redemption indicia on the lottery ticket.

9. The method of claim 7 wherein providing the stored-value card comprises providing an electronic stored-value card.

10. The method of claim 6 wherein communicating the result comprises providing the purchaser with a coupon redeemable for the winning value amount for the lottery ticket.

11. The method of claim 6 wherein communicating the result comprises providing the purchaser with the winning value amount for the lottery ticket.

12. The method of claim 11 wherein providing the purchaser with the winning value amount for the lottery ticket comprises providing instructions concerning refunding the purchaser an amount equal to the purchase price of the at least one good or service.

13. The method of claim 1, wherein processing the lottery ticket purchase comprises receiving an activation message from a retailer of a plurality of retailers, wherein the purchase transaction is initiated at a point of sale of the retailer.

14. The method of claim 13, wherein the activation message enables the lottery ticket to be used as payment in a subsequent purchase transaction.

15. A computer-implemented system for providing a lottery game, wherein the lottery game comprises a lottery game prize, and wherein the lottery game prize is equal to a purchase price of a purchase transaction comprising at least one good or service, the system comprising:
   a lottery ticket provider;
   a lottery game provider;
   a lottery ticket, wherein the lottery ticket comprises a physical substrate;
   a point of sale, wherein the point of sale determines the purchase price of the at least one good or service at a time of the purchase transaction for the at least one good or service;
   and
   a purchase transaction processor, wherein the purchase transaction processor establishes a prize amount for the lottery game, wherein the prize amount is equal to a purchase price of the purchase transaction minus a purchase price of the lottery ticket, wherein the purchase transaction processor processes the purchase of the lottery ticket, and wherein the purchase transaction processor initiates the lottery game upon the processing of the purchase of the lottery ticket at the time of the purchase transaction.

16. The computer-implemented system of claim 15 wherein a wager amount required to purchase the lottery ticket is provided by the lottery ticket provider.

17. The computer-implemented system of claim 15 wherein the purchase price of the lottery ticket is a fixed amount.

18. The computer-implemented system of claim 15 wherein the purchase price of the lottery ticket is determined based on the purchase price of the at least one good or service.

19. The computer-implemented system of claim 18 wherein the purchase price of the lottery ticket is a difference of the purchase price of the purchase transaction and a next, greater whole dollar amount.

20. The computer-implemented system of claim 15 wherein the lottery ticket provider is the lottery game provider.

* * * * *